United States Patent [19]
van Mansvelt et al.

[11] 4,255,765
[45] Mar. 10, 1981

[54] THEODOLITE FOR TRACKING AND MEASURING A FLYING OBJECT WITH A TV CAMERA ARRANGED AT A TELESCOPE

[75] Inventors: C. Friso van Mansvelt, Wallisellen; Hansruedi Ritter, Rümlang; Walter Eicher, Gockhausen, all of Switzerland

[73] Assignee: Contraves AG, Zurich, Switzerland

[21] Appl. No.: 73,535

[22] Filed: Sep. 7, 1979

[30] Foreign Application Priority Data

Sep. 20, 1978 [CH] Switzerland .................... 9809/78

[51] Int. Cl.$^3$ .................... G02B 23/12; H04N 5/26
[52] U.S. Cl. .................... 358/225; 352/131; 358/97
[58] Field of Search .................... 358/93, 97, 125, 225; 350/19, 171–173; 250/203 Ct; 33/1 T; 352/131

[56] References Cited

U.S. PATENT DOCUMENTS

| 3,175,089 | 3/1965 | Tallex et al. | 358/225 |
| 3,287,497 | 11/1966 | Back | 358/225 |

FOREIGN PATENT DOCUMENTS

| 554730 | 7/1932 | Fed. Rep. of Germany | 352/131 |
| 1130103 | 1/1957 | France | 352/131 |

Primary Examiner—Joseph A. Orsino, Jr.
Attorney, Agent, or Firm—Werner W. Kleeman

[57] ABSTRACT

A theodolite for target tracking and target measuring with a telescope composed of a mirror objective and a collimator. The real image produced by the mirror objective is projected to infinity by the collimator, so that there is formed an afocal beam of light. This beam of light is delivered by means of a partially permeable mirror surface to a television camera and at least one other image evaluation device (camera). The television camera is arranged at the telescope at an unlaterable position with respect to the telescope tube. The partially permeable mirror surface, branching-off part of the beam of light to the television camera, is arranged between the collimator and a further mirror surface serving for fading-in the image of a crosshair at the beam of light. The invention advantageously serves for constructng a theodolite having a control of the target tracking by the signals emanating from the television camera (TV-tracking).

2 Claims, 1 Drawing Figure

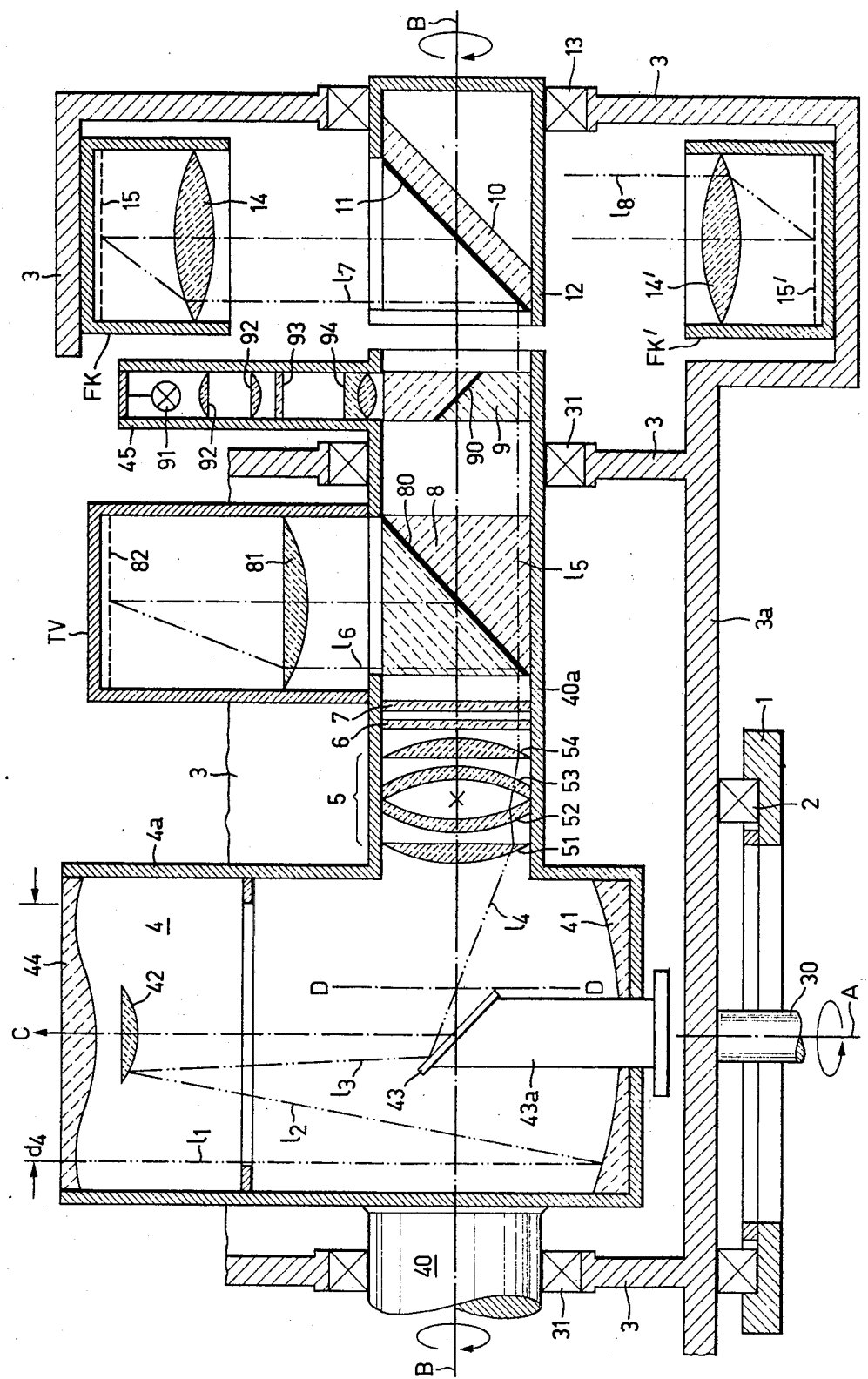

THEODOLITE FOR TRACKING AND MEASURING A FLYING OBJECT WITH A TV CAMERA ARRANGED AT A TELESCOPE

BACKGROUND OF THE INVENTION

The present invention relates to a new and improved construction of theodolite for tracking and measuring a flying target or object—hereinafter simply referred to as a flying target—which is of the type comprising a telescope equipped with a telescope tube and composed of a mirror objective and a collimator. The telescope is mounted to be rotatable, about a horizontal axis, relative to a theodolite housing, and the theodolite housing, in turn, is mounted to be rotatable, about a vertical axis, in a socket or pedestal construction. The collimator projects to infinity a real image produced by the mirror objective and thus delivers an afocal beam of light which is infed by means of a first, partially permeable mirror surface to a television camera and to at least one other image evaluation device.

Now in German Pat. No. 1,802,120 there is disclosed a theodolite which is equipped with a telescope of the previously described type. The afocal beam of light is selectively delivered to one of a number of image evaluation devices by means of a mirror. According to a further development of such state-of-the-art theodolite the mirror is replaced by a partially permeable mirror, so that the beam of light can be simultaneously delivered to at least one television camera and further image evaluation device, for instance, a film or photocamera. Moreover, from the aforementioned prior art German patent it is also known to employ a partially permeable mirror for fading-in the image of a crosshair at the beam of light.

However, the heretofore known prior art construction of theodolite is associated with certain notable drawbacks. Firstly, this known arrangement results in the image of the crosshair being faded-in at all of the image evaluation devices. While this in itself is not disturbing as long as the television image only serves for observation, when using the television camera for controlling the target tracking (TV-tracking) it is however necessary to suppress the image of the crosshair. Additionally, the heretofore known arrangement is structured such that the rotational movement of the telescope tube about its horizontal axis of rotation causes rotation of the image of the television camera. When using the television camera for controlling the target tracking it is therefore necessary to either provide a coordinate transformation or a compensating measure, such as derotation for the image rotation. Due to this construction the equipment becomes more complicated and expensive.

Finally, it has been found that a partially permeable mirror, while constituting a simple optical element, does however have its light permeable or transmission characteristics vary in a rather complicated manner during its rotation. With the heretofore known arrangement the continuous TV-target tracking in combination with the possibility of switching between a number of cameras, requires that the TV-camera receive the beam of light which has been passed by the partially permeable mirror. It has been found that during switching by means of a good mechanically realized movement of the partially permeable mirror there cannot be avoided fluctuations of the light intensity at the TV-camera. This can however markedly impair the target tracking: the probability is great that shortly prior to an interesting phase of the target measuring there is switched from one camera, for instance a standard camera, to another camera, for instance a high-speed camera, which imparts a control surge to the automatic TV-target tracking, which, in turn, can result in loss of the target.

It is further to be mentioned that the delivery of the beam of light which has been passed by the partially permeable mirror to the TV-camera is unfavorable in terms of the coating of the mirror surface. What is desired is a division of the light beams, with about 80% going to the camera and 20% to the TV-camera. An 80% reflection requires a metallic coating, which is associated with high absorption losses.

SUMMARY OF THE INVENTION

Therefore, with the foregoing in mind it is a primary object of the present invention to provide a new and improved construction of theodolite of the character described which is not associated with the aforementioned drawbacks and limitations of the prior art proposals.

Another and more specific object of the present invention aims at providing a new and improved construction of theodolite for tracking and measuring a flying target by means of a TV-camera arranged at a telescope, which is not afflicted with the aforementioned drawbacks and limitations of the prior art constructions discussed heretofore, and specifically, affords accurate and reliable target tracking and measuring.

Yet a further significant object of this invention is to provide a novel construction of theodolite which is relatively simple in design, extremely reliable in operation, not readily subject to breakdown or malfunction, and requires a minimum of maintenance and servicing.

Now in order to implement these and still further objects of the invention, which will become more readily apparent as the description proceeds, the theodolite of the present development is manifested by the features that the first mirror surface and the TV-camera are arranged at the telescope in a position which is unalterable relative to the telescope tube.

According to a further aspect of the invention there is provided a second mirror surface for fading-in the image of the crosshair at the beam of light. The invention contemplates arranging the first mirror surface between the collimator and the second mirror surface.

By means of the invention it is possible to prevent right at the outset the occurrence of the aforementioned drawbacks, instead of having to perform complicated and expensive compensation operations. The suppression of the image of the crosshair at the television image is no longer needed, since the light of the crosshair is not delivered to the TV-camera. Switching between different image evaluation devices does not have any effect upon the TV-camera and upon the target tracking controlled by such TV-camera, since there is initially faded-out the beam of light for the TV-camera. The television or TV-image is not rotated due to the rotation of the telescope about its horizontal axis, since the telescope and the TV-camera conjointly rotate. The infeed of the beam of light to the TV-camera, which light beam is faded or focused-out by the partially permeable mirror, enables using dielectric layers for coating the mirror surface. These dielectric layers have low losses and without difficulty permit attaining the desired partial permeability of 80%.

BRIEF DESCRIPTION OF THE DRAWING

The invention will be better understood and objects other than those set forth above, will become apparent when consideration is given to the following detailed description thereof. Such description makes reference to the annexed drawing wherein the single FIGURE shows a theodolite constructed according to the invention having a theodolite housing rotated about a vertical axis and equipped with a telescope pivotable therein about a horizontal axis, there also being shown related image evaluation devices for the beam of light which emanates from the telescope.

DETAILED DESCRIPTION OF THE PREFERRED EMBODIMENTS

Describing now the drawing, it is to be understood that only enough of the construction of the theodolite has been shown in the drawing to simplify the illustration thereof, while enabling those versed in the art to readily understand the underlying principles and concepts of the present development. Turning attention now to the drawing, reference character 1 designates a bearing ring which is rigidly connected with a not further shown, but conventional socket or pedestal construction of the theodolite. Rotatably seated upon the bearing or support ring 1 is a base plate 3a of a theodolite housing 3 which is mounted with the aid of the roller bearing 2 or equivalent structure, so as to be rotatable about an essentially vertical axis of rotation A. The rotation of the base plate 3a is accomplished by rotating a shaft 30 driven by any suitable drive motor which has not been particularly shown. A shaft 40 is rotatably mounted about a horizontal axis B in two bearings 31 of the theodolite housing 3. This shaft 40 carries a telescope 4 have a telescope tube 4a, the optical axis C of which is disposed transversely with respect to the rotational axis B. Shaft 40 is likewise driven by any suitable and thus not particularly shown drive motor.

During operation of the theodolite with target tracking of a flying target, the optical axis C of the telescope 4 is continuously maintained in known manner, by appropriately controlling the drive motors which serve to drive the shafts 30 and 40, at a flying target which is to be continuously tracked, typically for instance a rocket. Also, the momentary rotational positions of the theodolite base plate 3a and the telescope tube 4a are each continuously determined in relation to a starting position, in order to serve for the determination of the momentary azimuth and elevation angle of the flying target which is to be sighted.

A mirror objective, mounted in the telescope tube 4a, is structured for imaging the field of view of the telescope 4 in a primary image surface D—D oriented transversely with respect to the horizontal axis B. For this purpose this optical system comprises a spherically ground convex mirror 41 which is mounted at the base of the telescope tube 4a and a convex mirror 42 which is mounted at the region of the not particularly referenced inlet opening, and a flat or planar mirror 43 mounted at the point of intersection of the axes B and C and inclined by $\pi/4$ with respect to such axes, mirror 43 being mounted upon a pedestal or socket 43a. The glass plate 44 which is mounted at the image inlet opening of the telescope tube 4a and the convex mirror 42 are ground such that the real image of the field of view of the telescope 4, produced in the image surface D—D, is spherically corrected; such type mirror telescope objectives are well known and available under the commercial designation "Schmidt-Cassegrain"-objective.

The image in the image surface D—D is projected afocally approximately in the direction of the axis B, by means of a collimator 5, composed of the lenses 51, 52, 53 and 54 and mounted in a hollow part 40a of the shaft 40 coaxially with respect to the axis B. The Schmidt-Cassegrain mirror objective in the telescope 4 and the collimator 5 thus collectively form an afocal optical system, the image plane of which is located at infinity. The light rays at the side of the image are parallel. A light beam at the edge of the inlet opening, here indicated generally by reference character $d_4$, influxing parallel to the telescope axis C, moves along the paths indicated by reference characters $1_1$, $1_2$, $1_3$, $1_4$, $1_5$, $1_6$, $1_7$ and $1_8$. Therefore, it is optionally possible to select different distances between the thus constructed optical system and any image evaluation devices, for instance film, photo or television cameras. Also, without any impairment of the image accuracy it is possible to use plane-parallel elements at the beam of light or light rays $1_5$ at the side of the image, for instance a color filter disk 6 and a neutral or grey wedge disk 7.

There is arranged along the path of rays or light beam $1_5$, following the disks 6 and 7, a prism 8 equipped with a partially permeable mirror surface 80 which is inclined by $\pi/4$ with respect to the axis B. This prism 8 with the mirror surface 80 enables fading or focusing-out part of the beam transversely with respect to the axis B, as indicated by the light beam or rays $1_6$. The faded-out beams strike an objective 81 of a television camera TV, where they are focused at the image plane 82 thereof.

The television or TV-camera TV serves, in known manner, not only for the television portrayal of the telescope image, but it also can be used for aligning the telescope axis C at the flying target which is to be tracked, in other words TV-tracking, if such variant of target tracking is desired. The prism 8 and the television camera TV are arranged in a position which is not altered relative to the telescope tube 4a (in the drawing the axes of the telescope tube 4a and the television camera TV are parallel, but such arrangement is however not absolutely required). The prism 8 and the television camera TV thus rigidly follow all of the movements of the telescope tube 4a, so that movements of the telescope do not influence the television image and particularly when using the television camera for target tracking there are not required any image corrections, so-called derotation. At the prism 8 there is faded or focused-out approximately 20% of the light intensity in the direction of the light beam $1_6$, the remaining 80% is passed, something which can be realized in a favorable and conventional manner by employing low loss dielectric layers or coatings at the mirror surface 80.

After passing through the prism 8 there is arranged along the path of the rays or light beam $1_5$ a prism 9 having a partially permeable mirror surface 90 inclined by $\pi/4$ with respect to the axis B. This prism 9 with the mirror surface 90 renders possible the fading or focusing-in of a crosshair at the part of the light beam which is linearly passed by the prism 8; this crosshair does not appear at the television image. For this purpose there protrudes from the telescope tube portion or shaft portion 40a an auxiliary tube 45 within which there are arranged in tandem an incandescent lamp 91, a condenser lens system 92, a diaphragm 93 with cross-gap or crosshair-insert and a collimation objective 94 for imaging the illuminated crosshair at infinity. Thereafter the beam of light emanating from the prism 9 strikes a mirror or reflector 10 having a mirror surface 11 which is inclined by $\pi/4$ with respect to the axis B. This mirror 10 is arranged in a housing 12 mounted with the aid of a bearing means 13 at the theodolite housing 3 in such a manner that the mirror 10 can be rotated about the axis B, but entirely independent of the rotation of the shaft 40. At a certain rotational position of the mirror 10, for instance in the position shown in the drawing, the light beam or light rays $1_5$ are deflected in the manner indicated by the light beam $1_7$. The beam of light which is deflected at the mirror 10 falls upon an objective 14 of a camera FK which is attached at the theodolite housing 3 and at the image plane 15 of which there is focused the beam of light. In another rotational position of the mirror 10, for instance as indicated in the drawing, following a rotation of the mirror 10 through 90° in relation to the position described heretofore, the beams or light rays are deflected such as represented by the light rays or light beams $1_5$ and $1_8$. The beam of light which is deflected at the mirror 10 then impinges upon an objective 14' of another camera FK', likewise fixedly positioned in relation to the theodolite housing 3 and at the image plane 15' of which there is focused the beam of light. For instance, the camera FK is a standard film camera, whereas the camera FK' is a special film camera for high-speed photography. By virtue of the described arrangement of the prism 9 and the related elements in front of the mirror 10 with the associated cameras the image of the crosshair is superimposed upon the image of the telescope 4 and is photographically fixed together with such image; the adjustment of the brightness of the crosshair can be optimum, since only the properties of the film and the camera need be taken into account, and, particularly, the television camera does not contain the image of the crosshair or equivalent structure. Upon changing over operation from one camera to the other there is not altered the light intensity at the television camera since in all instances the same elements act without alteration along the path of travel of the light. Moreover, it is to be remarked that in the drawing there have been shown two photocameras, but, depending upon the available space, it would be possible to provide three or more image evaluation devices at the theodolite, and that such need not be only photocameras, rather also can be television cameras for instance for tape recordal (video-recorders) or for infrared observation or even special devices, such as brightness sensors, spectral analyzers and the like.

While there are shown and described present preferred embodiments of the invention, it is to be distinctly understood that the invention is not limited thereto, but may be otherwise variously embodied and practiced within the scope of the following claims. Accordingly,

What we claim is:

1. A theodolite for tracking and measuring a flying target comprising:
    telescope means having a telescope tube;
    said telescope means containing a mirror objective and a collimator;
    a theodolite housing;
    means for mounting said telescope means rotatably relative to the theodolite housing about a substantially horizontal axis;
    means for mounting said theodolite housing for rotation about a substantially vertical axis;
    said collimator projecting a real image produced by the mirror objective to infinity, to thereby deliver an afocal bundle of light rays;
    a television camera;
    at least one image evaluation device;
    means defining a first partially permeable mirror surface;
    said bundle of light rays being delivered by means of said first partially permeable mirror surface to said television camera and said at least one image evaluation device;
    means for producing an image of a crosshair;
    means defining a second mirror surface for fading-in the image of the crosshair at the light beam bundle;
    at least one of said image evaluation devices having a faded-in image appearing therein;
    said television camera having a faded-in free image appearing therein; and
    said mirror objective, said collimator, said first and second mirror surfaces and at least one further mirror surface are linearly arranged in an afocal bundle of light beams extending essentially linearly.

2. The theodolite as defined in claim 1, wherein:
    said first mirror surface and said television camera are arranged at said telescope means in an unalterable position relative to said telescope tube; and
    said first mirror surface is arranged between said collimator and said second mirror surface.

* * * * *